(12) United States Patent
Ueno et al.

(10) Patent No.: US 8,711,267 B2
(45) Date of Patent: Apr. 29, 2014

(54) SOLID-STATE IMAGING DEVICE

(75) Inventors: Risako Ueno, Tokyo (JP); Yoshinori Iida, Tokyo (JP); Hideyuki Funaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 322 days.

(21) Appl. No.: 13/039,502

(22) Filed: Mar. 3, 2011

(65) Prior Publication Data

US 2012/0050589 A1 Mar. 1, 2012

(30) Foreign Application Priority Data

Aug. 25, 2010 (JP) ................. 2010-188564

(51) Int. Cl.
*H04N 5/225* (2006.01)
*G02B 13/16* (2006.01)

(52) U.S. Cl.
USPC ........... 348/335; 348/340; 348/345; 348/348; 348/350

(58) Field of Classification Search
USPC .......... 348/335, 340, 345, 348, 349, 350, 352
See application file for complete search history.

(56) References Cited

U.S. PATENT DOCUMENTS

| | | |
|---|---|---|
| 2007/0014019 A1 | 1/2007 | Mouli |
| 2007/0040828 A1 | 2/2007 | Zalevsky et al. |
| 2007/0222885 A1* | 9/2007 | Katsuno et al. ............... 348/340 |
| 2008/0142681 A1 | 6/2008 | Takizawa et al. |
| 2009/0027542 A1 | 1/2009 | Yamamoto et al. |
| 2009/0128658 A1 | 5/2009 | Hayasaka et al. |
| 2010/0066823 A1 | 3/2010 | Westphal et al. |
| 2010/0141802 A1 | 6/2010 | Knight et al. |
| 2010/0283884 A1 | 11/2010 | Hayasaka et al. |
| 2012/0057020 A1 | 3/2012 | Kobayashi et al. |
| 2012/0062771 A1 | 3/2012 | Ueno et al. |

FOREIGN PATENT DOCUMENTS

| | | |
|---|---|---|
| JP | 11-040787 | 2/1999 |
| JP | 2001-160973 | 6/2001 |
| JP | 2005-109445 | 4/2005 |
| JP | 2006-033493 | 2/2006 |
| JP | 2006033493 A * | 2/2006 |
| JP | 2008-011529 | 1/2008 |
| JP | 2009-224982 | 10/2009 |

OTHER PUBLICATIONS

Fife et al, A 3D Multi-Aperture Image Sensor Architecture, Custom Integrated Circuits Conference, pp. 281-284, Sep. 2006.

(Continued)

*Primary Examiner* — Yogesh Aggarwal
(74) *Attorney, Agent, or Firm* — Amin, Turocy & Watson, LLP

(57) ABSTRACT

According to an embodiment, a solid-state imaging device includes: an imaging element formed on a semiconductor substrate; a first optical system configured to focus an image of a subject on an imaging plane; a second optical system including a microlens array including a plurality of microlenses corresponding to the pixel blocks, and re-focusing the image of the imaging plane onto the pixel blocks corresponding to the respective microlenses; a first filter placed on the second optical system, and including a plurality of first color filters corresponding to the microlenses; and a second filter placed on the imaging element, and including a plurality of second color filters corresponding to the first color filters of the first filter. The first and second filters are designed so that the first and second color filters deviate to a periphery of the imaging area, the deviation becoming larger toward the periphery of the imaging area.

18 Claims, 14 Drawing Sheets

(56) References Cited

OTHER PUBLICATIONS

Japanese Office Action mailed Jun. 19, 2012 for Japanese Application No. 2010-188564.

Office Action for U.S. Appl. No. 13/039,508 Dated Apr. 26, 2013.

Japanese Office Action for Japanese Patent Application No. 2013-023676 mailed Jan. 17, 2014.

\* cited by examiner

US 8,711,267 B2

SOLID-STATE IMAGING DEVICE

CROSS-REFERENCE TO RELATED APPLICATION

This application is based upon and claims the benefit of priority from prior Japanese Patent Application No. 2010-188564 filed on Aug. 25, 2010 in Japan, the entire contents of which are incorporated herein by reference.

FIELD

Embodiments described herein relate generally to a solid-state imaging device that acquires a visible image and range information at the same time.

BACKGROUND

As imaging techniques for obtaining a depth-direction distance as two-dimensional array information, various methods are being developed, such as a technique utilizing reference light and a stereo distance measurement technique utilizing more than one camera. Particularly, in recent years, there is an increasing demand for relatively inexpensive products as novel input devices for consumer use.

Therefore, an imaging device that has an imaging lens as a structure to obtain a large number of parallaxes with many lenses and restrain decreases in resolution has been suggested. This imaging device includes an imaging-type lens and optical systems serving as a re-imaging-type optical system placed between the imaging-type lens and the imaging element, for example. The optical systems may be formed by a microlens array having a large number of minute lenses formed on a flat face, for example. Pixels that capture images from the microlenses are provided at the corresponding locations under the respective microlenses. An image formed at the imaging lens is again formed on the imaging element by re-imaging microlenses. The re-imaged single-lens image is an image with a viewpoint deviation that is equivalent to the parallax existing at each location of the microlenses. By performing image processing on parallax images obtained from a large number of microlenses, the distance to the subject can be estimated based on the principles of triangulation. Also, by performing image processing to combine images, a two-dimensional image can be reconstructed. As an example of the image processing technique for estimating the distance to the subject, a general-purpose stereo image processing technique can be used. By such a stereo image processing technique, images are compared, and the portions formed by imaging the same point on the subject are determined by an image matching technique or the like.

However, there is a problem that the optical color cross talk between adjacent microlenses lowers the accuracy of matching parallax images.

DETAILED DESCRIPTION

Hereinafter, embodiments of the present invention will be described more specifically with reference to the drawings.

According to an embodiment, a solid-state imaging device includes: an imaging element formed on a semiconductor substrate, and including an imaging area including a plurality of pixel blocks each including a plurality of pixels; a first optical system configured to focus an image of a subject on an imaging plane; a second optical system comprising a microlens array including a plurality of microlenses corresponding to the pixel blocks, and re-focusing the image of the imaging plane onto the pixel blocks corresponding to the respective microlenses; a first filter placed on the second optical system, and including a plurality of first color filters corresponding to the microlenses; and a second filter placed on the imaging element, and including a plurality of second color filters corresponding to the first color filters of the first filter. The first and second filters are designed so that the first and second color filters deviate to a periphery of the imaging area, the deviation becoming larger toward the periphery of the imaging area.

First Embodiment

Figure 1:
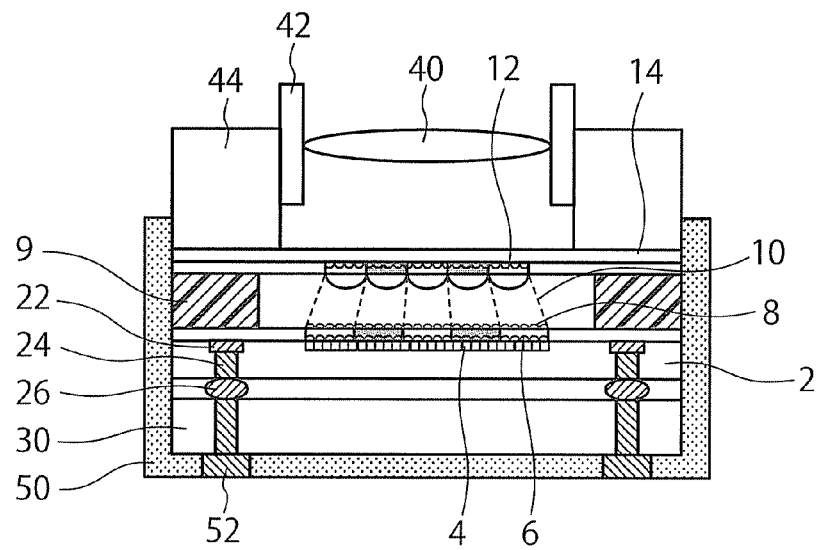
FIG. 1 is a cross-sectional view of a solid-state imaging device according to a first embodiment.

FIG. 1 shows a solid-state imaging device according to a first embodiment.

The solid-state imaging device according to the present embodiment includes an imaging element in which pixels 4 having photodiodes are formed on a semiconductor substrate 2, and a drive/read-out circuit (not shown) that drives the pixels 4 and reads signals from those pixels 4 is provided. On the pixels 4, color filters 6 are provided for respective pixel blocks each containing, for example, p×q pixels (p and q are natural numbers). On the color filters 6, microlenses 8 for pixel light gathering may be provided for the respective pixels.

A visible light transmission substrate 14 that transmits visible light and has an imaging microlens array 10 and color filters 12 are provided above the color filters 6. The visible light transmission substrate 14 is joined to the semiconductor substrate 2 by a spacer 9 made of a resin material provided around the imaging area in which the pixels 4 are formed. The positioning between the semiconductor substrate 2 and the visible light transmission substrate 14 to be joined to each other is performed with reference to an alignment mark or the like. The visible light transmission substrate 14 may be made of a material that blocks unnecessary infrared rays, or a film that blocks infrared rays may be formed on the visible light transmission substrate 14, for example. The visible light transmission substrate 14 is joined to the semiconductor substrate, so that the colors of the color filters 6 correspond to the colors of the color filters 12. Also, the intervals between the colors of the color filters 6 are made narrower than the intervals between the colors of the color filters 12.

Electrode pads 22 for reading the pixels 4 are provided in the semiconductor substrate 2, and through electrodes 24 that penetrate through the semiconductor substrate 2 are formed under the electrode pads 22. The semiconductor substrate 2 is electrically connected to a chip 30 via the through electrodes 24 and bumps 26. The chip 30 includes a drive processing circuit that drives the imaging device and processes read image data.

An imaging lens 40 is provided above the visible light transmission substrate 14, and is attached to a lens tube 42. The lens tube 42 is attached to a lens holder 44. The lens holder 44 is bonded onto a peripheral area of the visible light transmission substrate 14 in which the color filters 12 are not provided. When the lens 40 is attached, the focal length of the lens 40 may be adjusted based on the relationship between the pressure and the output image. A light shielding cover 50 for shielding unnecessary light is provided around the semiconductor substrate 2, the visible light transmission substrate 14, and the chip 30. Module electrodes 52 that electrically connect the chip 30 to the outside are provided in the light shielding cover 50.

(Color Cross Talk) Prevention with Color Filters)

Referring now to FIGS. 2 through 5, the color cross talk preventing function with the color filters in the solid-state imaging device of the present embodiment having the above structure will be described.

Figure 2:
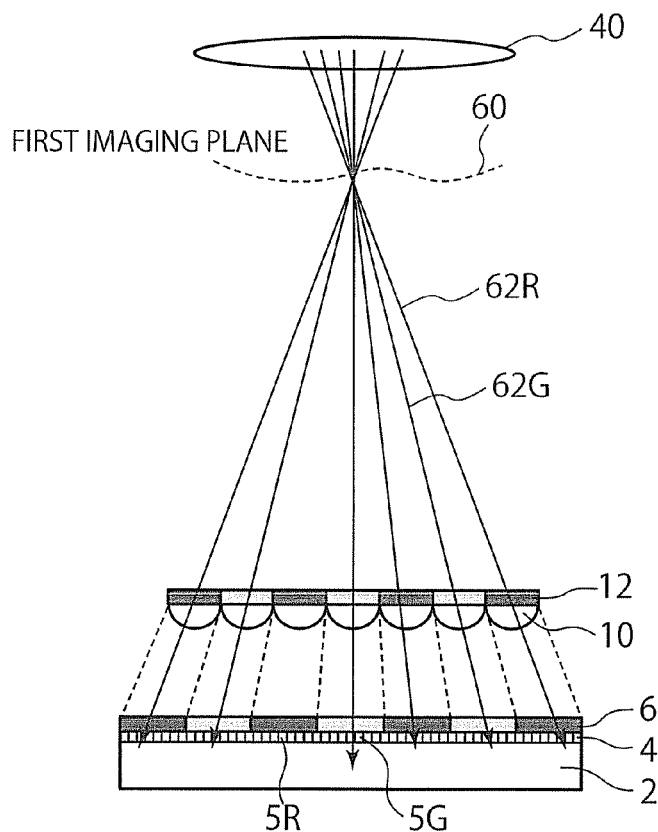
FIG. 2 is a diagram for explaining a relationship between two kinds of color filters.

FIG. 2 shows the color filters 6 and 12 and corresponding pixel areas. Microlenses 10 and the color filters 6 and 12 are provided for respective pixel blocks 5R and 5G. The color filters 12 are placed on the side of the microlenses 10, and the color filters 6 are placed on the side of the pixel blocks 5R and 5G that perform photoelectric conversions. Light rays that have passed through the imaging lens 40 are focused onto an imaging plane 60, and then enter the color filters 12. The respective colors are filtered through the microlenses 10 and the pixel blocks 5R and 5G. The color cross talk components of the different colors of adjacent pixels are absorbed and eliminated by the color filters 6 and 12. The pixel blocks 5R indicate pixel blocks that sense red colors, and the pixel blocks 5G indicate pixel blocks that sense green colors. That is, light rays 62R that represent red color pass through the imaging lens 40, and are focused onto the imaging plane 60. The light rays 62R then pass through the red transmission filters of the color filters 12 and the red transmission filters of the color filters 6. The light rays 62R are then captured into the pixel blocks 5R. Likewise, light rays 62G that represent green color pass through the imaging lens 40, and are focused onto the imaging plane 60. The light rays 62G then pass through the green transmission filters of the color filters 12 and the green transmission filters of the color filters 6. The light rays 62G are then captured into the pixel blocks 5G.

Figure 3:
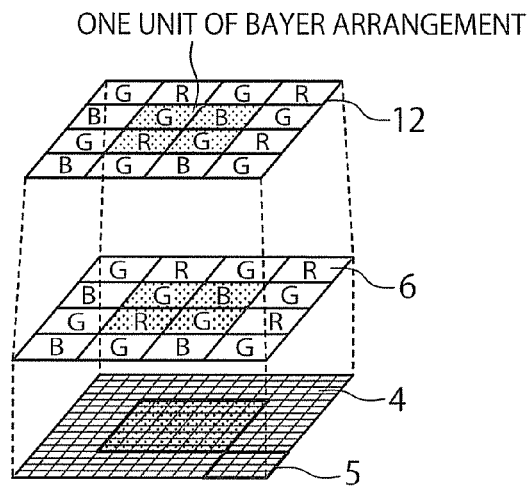
FIG. 3 is a diagram for explaining a case where the two kinds of color filters are in a Bayer arrangement.

The color arrangement of each pixel block may be a primary-color Bayer arrangement, for example, as shown in FIG. 3. A greater color cross talk prevention effect can be achieved where the color filters of each two adjacent pixels differ from each other.

Figure 4:
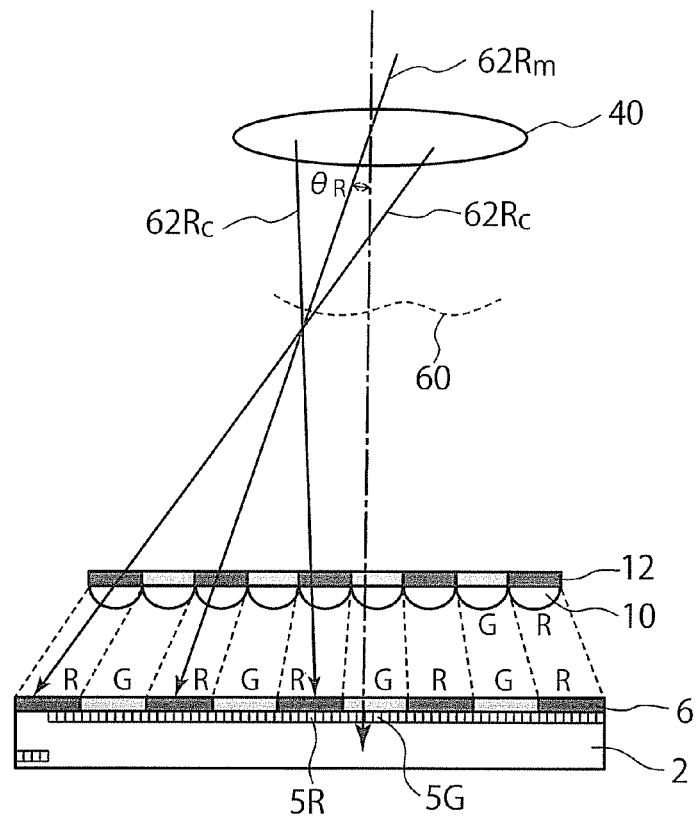
FIG. 4 is a diagram for explaining a color cross talk prevention effect.
Figure 5:
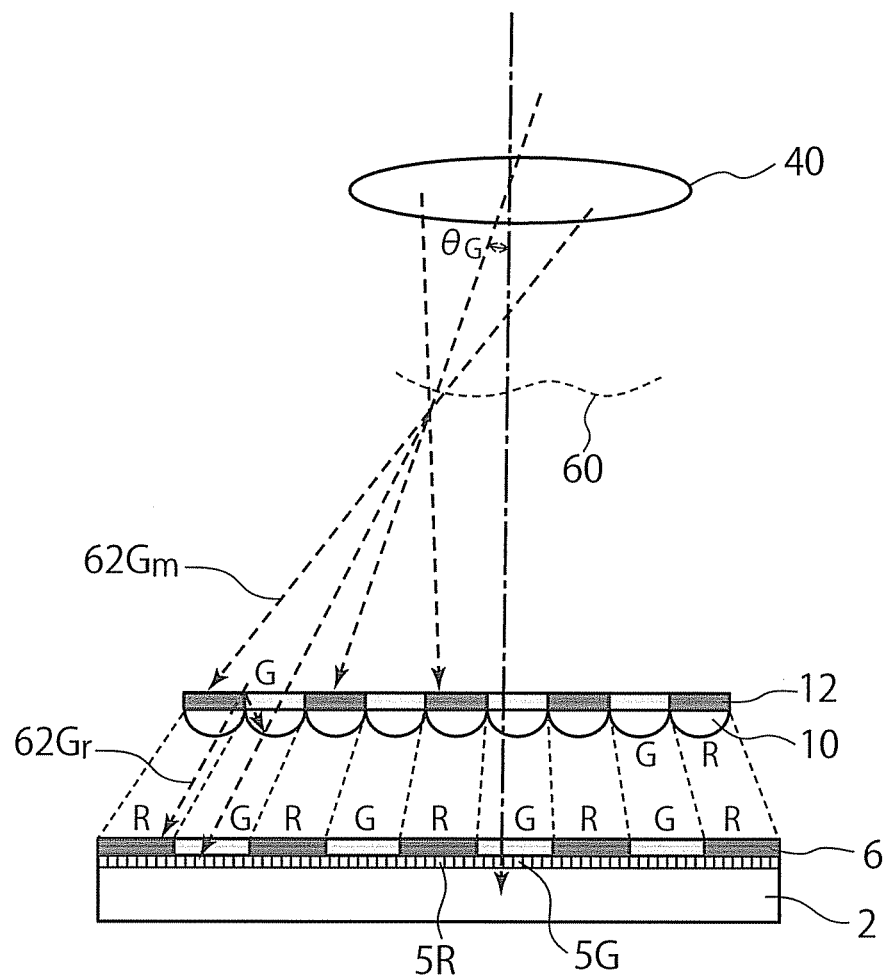
FIG. 5 is a diagram for explaining the color cross talk prevention effect.

Referring to FIGS. 4 and 5, a color cross talk prevention effect achieved in a case where the color filters 6 and 12 have a Bayer arrangement will be described. Only light rays representing the same colors at the color filters 6 and 12 pass through the color filters 12 and the color filters 6, and are focused onto the pixel blocks 5. For example, a red principal ray 62Rm that has entered the imaging lens 40 at an incident angle $\theta_G$ passes through the corresponding red transmission filter of the color filters 12. After that, the red principal ray 62Rm passes through the corresponding red transmission filter of the color filters 6 via the corresponding microlens 10. The red light rays 62Rc around the principal ray 62Rm also pass through the corresponding red transmission filters of the color filters 12, and then pass through the corresponding red transmission filters of the color filters 6 via the corresponding microlenses 10.

Also, as shown in FIG. 5, a green principal ray 62Gm that has entered the imaging lens 40 at an incident angle $\theta_R$ passes through the corresponding green transmission filter of the color filters 12. After that, the green principal ray 62Gm passes through the corresponding green transmission filter of the color filters 6 via the corresponding microlens 10. If there is a green light ray, such as a diffusedly reflected light ray 62Gr, that passes through a green transmission filter of the color filters 12 and then passes through a red transmission filter of the color filters 6 as shown in FIG. 5, the diffusedly reflected light ray 62Gr is a color cross talk component. However, the green light ray 62Gr attenuates at the red transmission filter of the color filters 6. Accordingly, the green light ray 62Gr as an optical signal can be prevented from entering the photodiode 4 in the pixel block 5, and color cross talk can be prevented.

(Deviation of Color Filters)

Next, deviation of the color filters 6 and 12 in the solid-state imaging device according to the present embodiment will be described.

Figure 6:
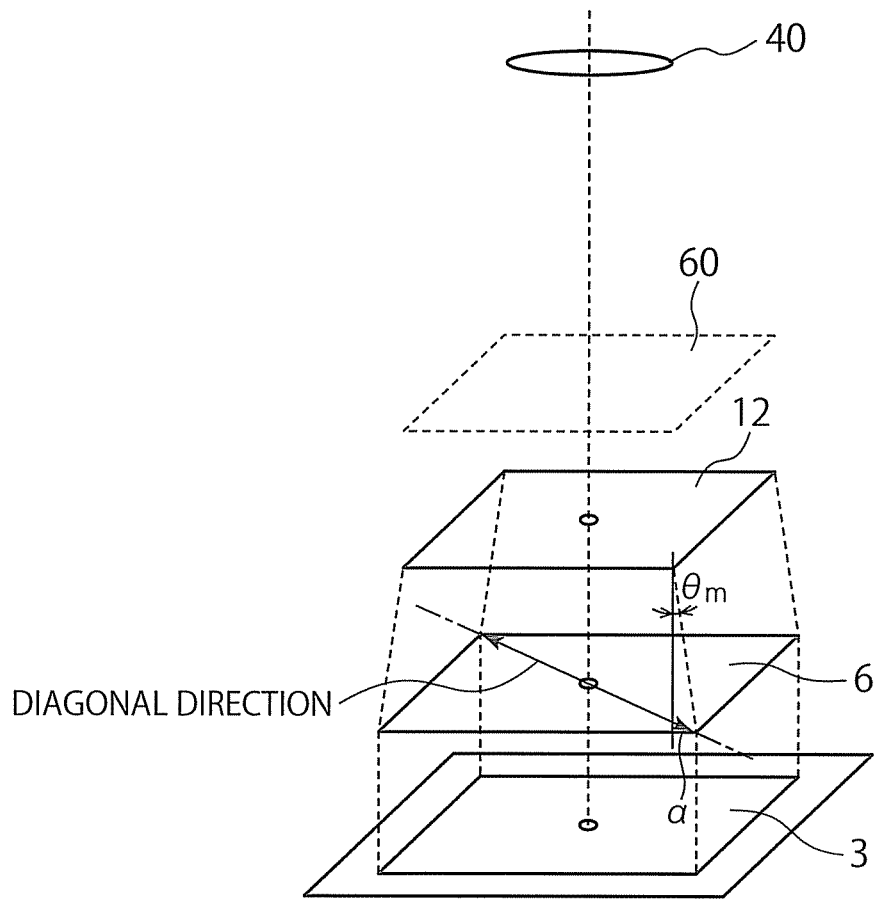
FIG. 6 is a diagram for explaining the amount of deviation of color filters.
Figure 7:
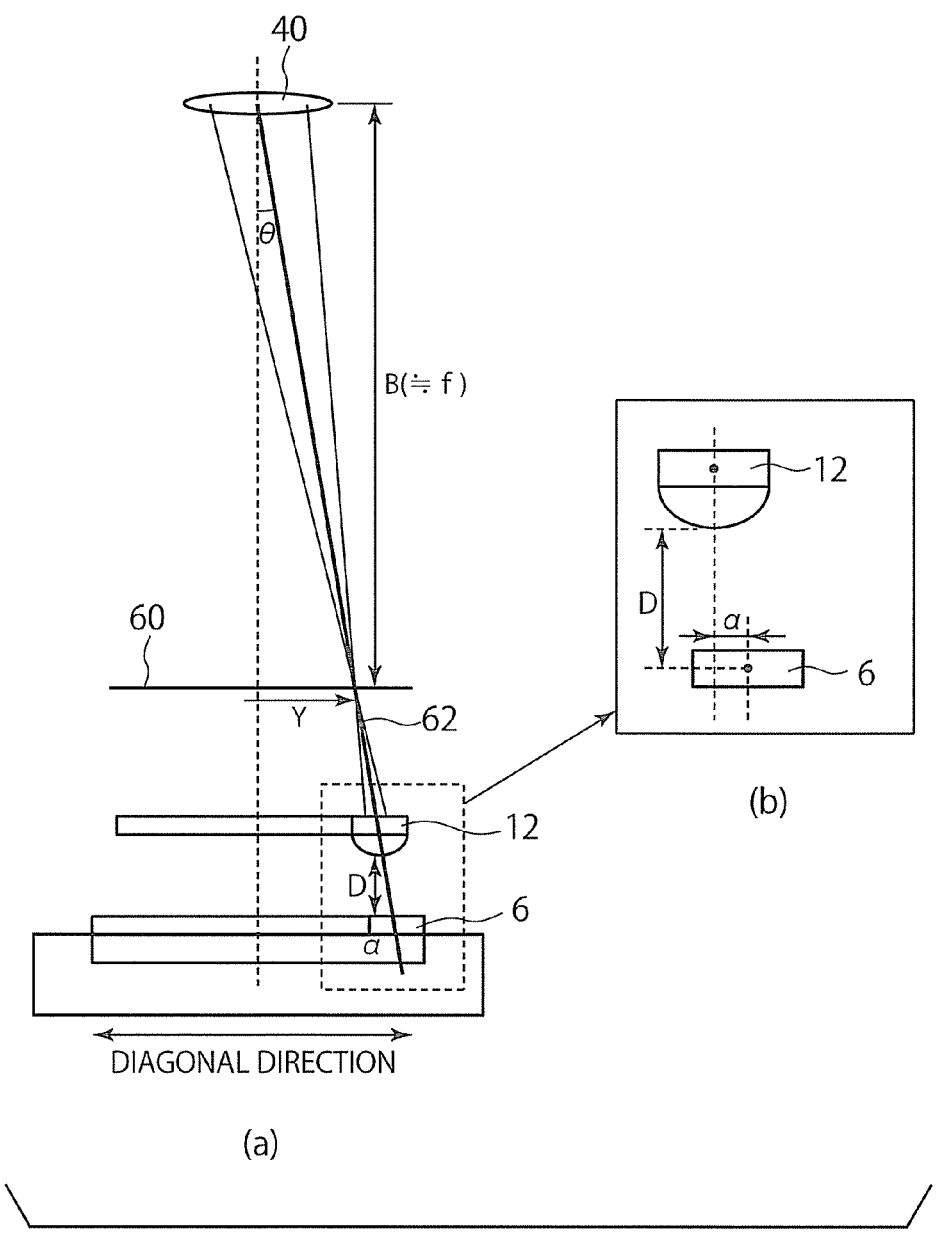
FIGS. 7(a) and 7(b) are diagrams for explaining the amount of deviation of color filters.

The color filters 6 and 12 deviate to the periphery of the imaging area, and the amount of misalignment becomes larger toward the periphery of the imaging area. FIGS. 6, 7(a), and 7(b) show the correspondence relationship. FIG. 6 is a perspective view of the color filters 6 and 12. FIG. 7(a) is a cross-sectional view of the color filters 6, taken along a plane extending in a diagonal direction of the color filters 6 of FIG. 6. FIG. 7(b) is an enlarged view of the portion surrounded by a broken line in FIG. 7(a).

As shown in FIG. 7(a), a red transmission filter 6R in the color filter 6 corresponds to a red transmission filter 12R in the color filter 12. A principal ray 62 of a subject that has entered the imaging lens 40 at an incident angle θ is focused onto the imaging plane 60, and then passes through the red transmission filter 12R and the red transmission filter 6R. Where f represents the focal length of the imaging lens 40, and the subject is located at infinity, the image height Y of the subject on the imaging plane 60 is represented by:

$$\tan \theta = Y/f$$

Here, the centers of the red transmission filter 6R and the red transmission filter 12R deviate from each other by an amount of deviation α. The amount of deviation α is represented by the following equation:

$$\alpha = D \times \tan\theta = D \times Y/f$$

where D represents the distance between the color filter 6 and the color filter 12 (or the distance between the color filter 6 and the corresponding microlens 10, if there are the microlenses 10). The incident angle θ of the principal ray 62 is the largest at the outermost portion of the imaging area, and the incident angle $\theta_{max}$ of the principal ray 62 at this point is taken into consideration. For example, the incident angle θ of the principal ray 62 may be 30 degrees in half-angle of view, which is a standard among cellular phones and compact cameras. If D is 1 mm in that case, the amount of deviation α at the four corners of the imaging area is 0.577 mm.

The amount of deviation at any portion other than the outermost portion is determined by the incident angle θ of the principal ray 62 at each location. At the center of the imaging area, the incident angle θ of the principal ray 62 is zero degrees, and therefore, the amount of deviation α can be zero. Since θ becomes larger toward the outer periphery, it is preferable to set the amount of deviation α at a large value.

(Method for Acquiring Range Information from Optical Image)

Figure 8:
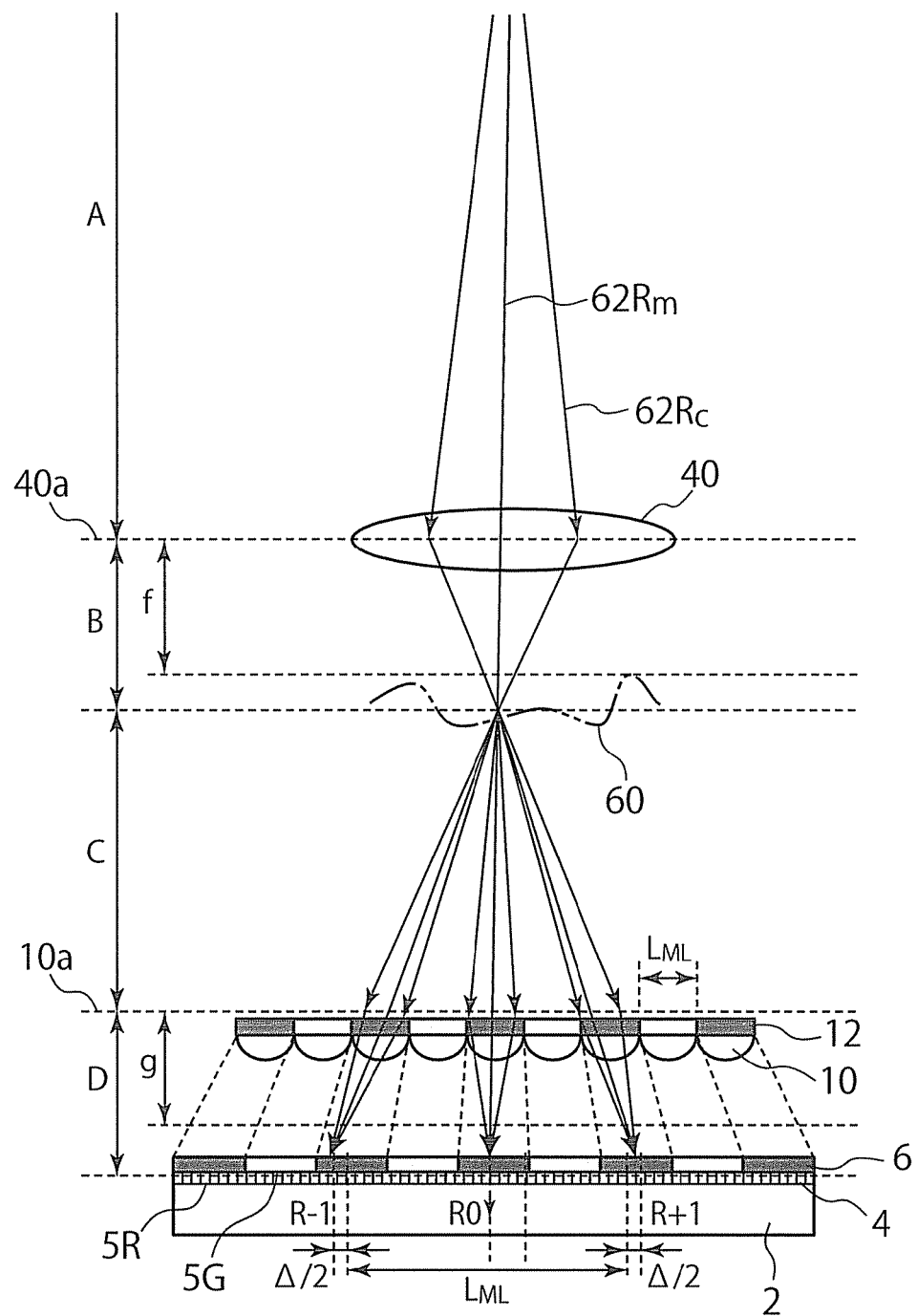
FIG. 8 is a diagram for explaining a method for acquiring range information from an optical image.

Referring now to FIG. 8, a method for acquiring range information from an optical image in the solid-state imaging device according to the present embodiment will be described. For simplification, only the numerical expressions within the range of an approximation of the optical axis are described herein.

Principal rays and the related rays from the subject are focused by the optical imaging system (the imaging lens) 40 onto the imaging plane 60 determined from the focal length of the optical imaging system and the distance from the subject, so that the relationship represented by the following equation (1) is satisfied.

$$\frac{1}{f} = \frac{1}{A} + \frac{1}{B} \tag{1}$$

Where, f represents the focal length of the imaging lens 40, A represents the distance from the subject-side principal surface 40a of the imaging lens 40 to the subject, and B represents the distance from the image-side principal surface 40a of the imaging lens 40 to the imaging plane 60. The imaging magnification (lateral magnification) of the imaging lens 40 is represented by the following equation.

$$M = \frac{B}{A} \tag{2}$$

The image on the imaging plane 60 is re-formed on the imaging element plane, in which the pixels 4 are provided, by the microlenses (hereinafter also referred to as MLs) 10 provided below the imaging plane 60. The image formation at the MLs 10 is represented by the following equation.

$$\frac{1}{g} = \frac{1}{C} + \frac{1}{D} \tag{3}$$

Where, g represents the focal length of the MLs 10, C represents the distance from the subject-side principal surface 10a of the MLs 10 to the imaging plane 60, and D represents the distance from the image-side principal surface 10a of the MLs 10 to the imaging element plane. At this point, the imaging magnification of the imaging system 40 is represented by the following equation (4).

$$N = \frac{D}{C} \tag{4}$$

Here, E of the following equation (5) is introduced based on the geometric relationship. In a case where the optical system 40 is a single-focus optical system, E has a fixed relationship.

$$E = B + C \tag{5}$$

Here, the inter-lens distance $L_{ML}$ and the amount of image deviation on one side Δ/2 in a case where two lenses to be compared are selected is represented by the following equation (6).

$$\frac{C}{L} = \frac{D_0}{\Delta} \tag{6}$$

Where $D_0$ represents the re-imaging distance when the reference subject is located at a location $A_0$.

The variations of the respective parameters with respect to movement of the subject (the variation of A) are as follows. The parameters with the index 0 at the right lower portion, such as $A_0$, represent initial values of the corresponding parameters. The variations of the respective parameters form the initial values are shown below in the form of equations.

According to the equations (1) through (5), the variation of D described with M (the magnification of the imaging lens) shows the relationship represented by the following equation (7):

$$D = \left(\frac{1}{g} - \frac{1}{(E-B)}\right)^{-1} = \tag{7}$$

$$\left(\frac{1}{g} - \frac{1}{C_0 + (B_0 - B)}\right)^{-1} = \left(\frac{1}{g} - \frac{1}{\frac{D_0}{N_0} + (M_0 - M)f}\right)^{-1}$$

According to the equations (1), (2), (6), and (7), the distance A from the subject and the amount of image deviation Δ has the relationship represented by the following equation (8):

$$A = \left(\frac{1}{f} - \frac{1}{B}\right)^{-1} = \tag{8}$$

$$\left(\frac{1}{f} - \frac{1}{B_0 + C_0 - C}\right)^{-1} = \left(\frac{1}{f} - \frac{1}{(M_0 + 1)f + \frac{D_0}{N_0} - \frac{LD_0}{\Delta}}\right)^{-1}$$

The amount of deviation A and the magnification M has the relationship represented by the following equation (9):

$$\Delta = \frac{D_0 L}{(M_0 - M)f + \frac{D_0}{N_0}} \quad (9)$$

When the subject A is located in a remote place, or when A is infinity while M is zero, the amount of deviation Δ converges on the value represented by the following equation (10):

$$\Delta = \frac{D_0 L}{M_0 f + \frac{D_0}{N_0}} \quad (10)$$

Here, the accuracy (the variation of Δ with respect to the variation of A) is represented by the following equation:

$$\frac{\partial \Delta}{\partial A} = \quad (11)$$

$$\frac{\partial \Delta}{\partial M} \frac{\partial M}{\partial A} = \frac{D_0 L f}{\left[(M_0 - M)f + \frac{D_0}{N_0}\right]^2} \times \left(-\frac{M^2}{f}\right) = \frac{-D_0 L M^2}{\left[(M_0 - M)f + \frac{D_0}{N_0}\right]^2}$$

Since the above equation (11) expressing the accuracy contains M (=B/A), the accuracy has distance dependency.

Based on the above described relationships, actual optical parameters are hypothetically set, and the amount of deviation Δ to be caused by movement of the subject A is shown. The hypothetical optical parameters are as follows:

Imaging lens focal length f: 7 mm or 42 mm
ML focal length g: 682 μm
ML arrangement pitch: 300 μm
Imaging element pixel pitch: 4.3 μm The above numerical values indicate the accuracy where the initial location $A_0$ is 0.3 m.

Here, $A_0$ represents the distance from the subject that is the shortest within the range in which focusing can be performed in a certain focusing position (or the limit closer to the depth field).

Figure 9:
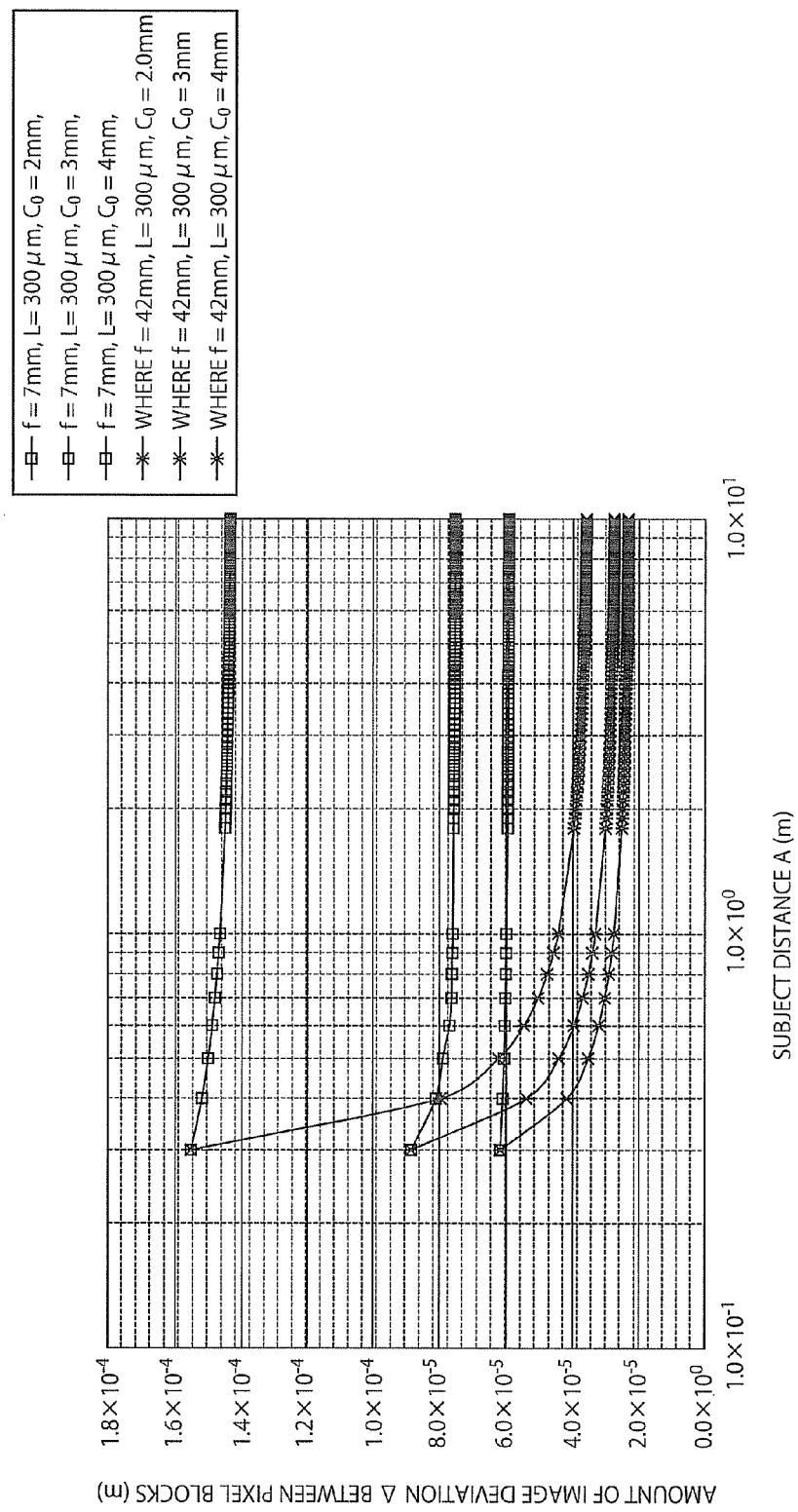
FIG. 9 is a diagram showing the dependence of the distance between the imaging plane and the ML principal surface on the amount of deviation.

FIG. 9 shows the dependency of the $C_0$ arrangement distance (the distance between the imaging plane 60 and the ML principal surface 10a) on the amount of deviation, where the imaging lens focal length f is 7 mm or 42 mm, and the initial focusing position $A_0$ is 0.3 m. Because of the amount of deviation Δ shown in the equation (10), the parallax convergence distance Δ becomes longer as f becomes shorter. When the converging amount of deviation Δ/2 becomes larger than the pixel block intervals, there is an over-range region in which crosstalk is caused between MLs. Therefore, the relationship between the convergence distance and the MLs is one of the guidelines in designing.

Figure 10:
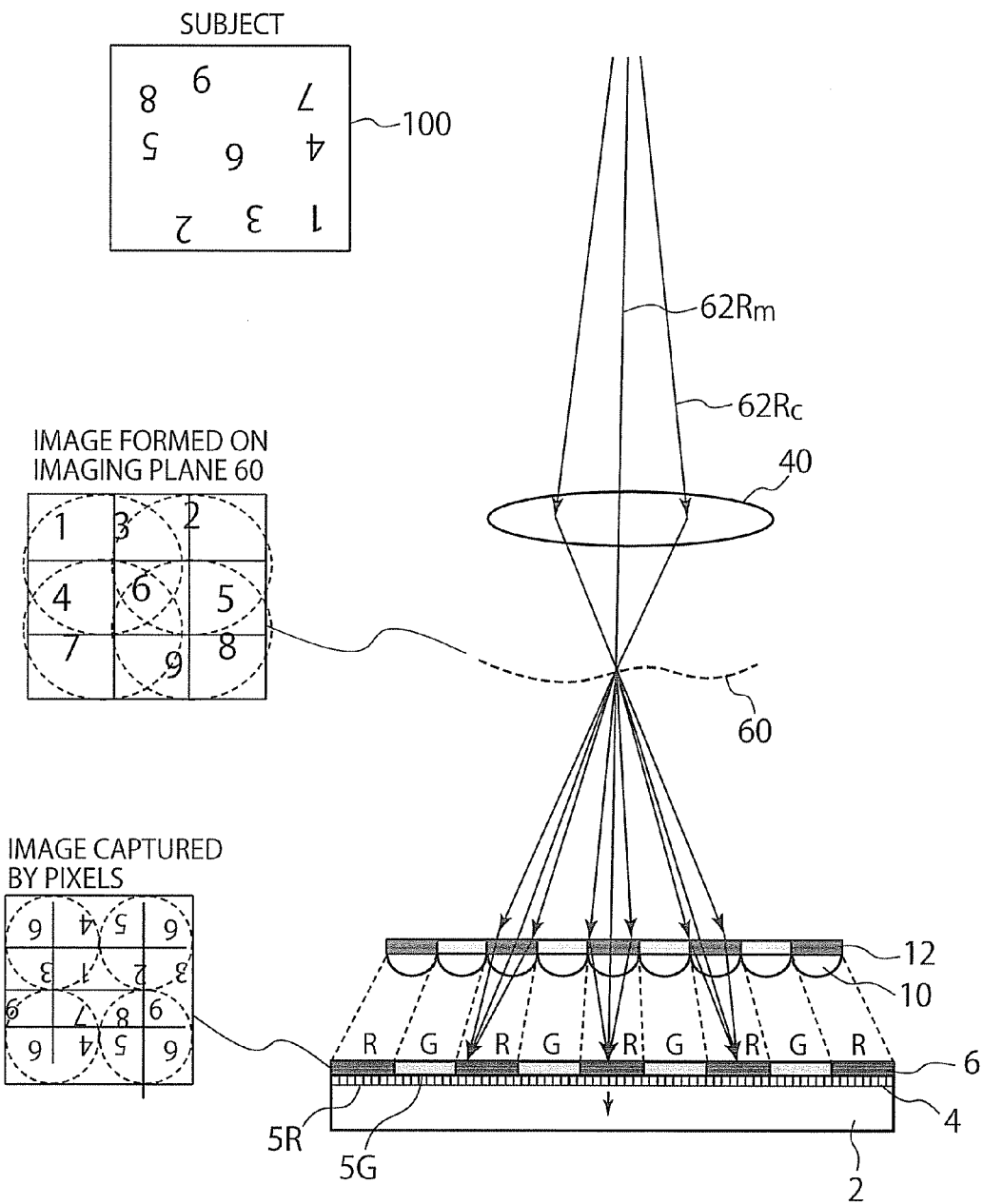
FIG. 10 is a diagram for explaining optical images obtained with the solid-state imaging device of the first embodiment.

FIG. 10 shows the relationship between the subject and an optical image obtained with the solid-state imaging device of the present embodiment. An inverted image of a subject 100 is formed on the imaging plane 60 by the imaging optical system (the imaging lens) 40. In that situation, the respective microlenses 10 are looking up at the image on the imaging plane 60 from a close distance, and parallax images overlapping slightly each other are formed on the respective pixel blocks 5R and 5G. The image re-formed at this point is again inverted to form an erected image. The image on the imaging plane 60 formed by the imaging optical system 40 is reduced in size by the microlenses 10. The reduction ratio determines the degree of optical resolution deterioration.

Figure 11:
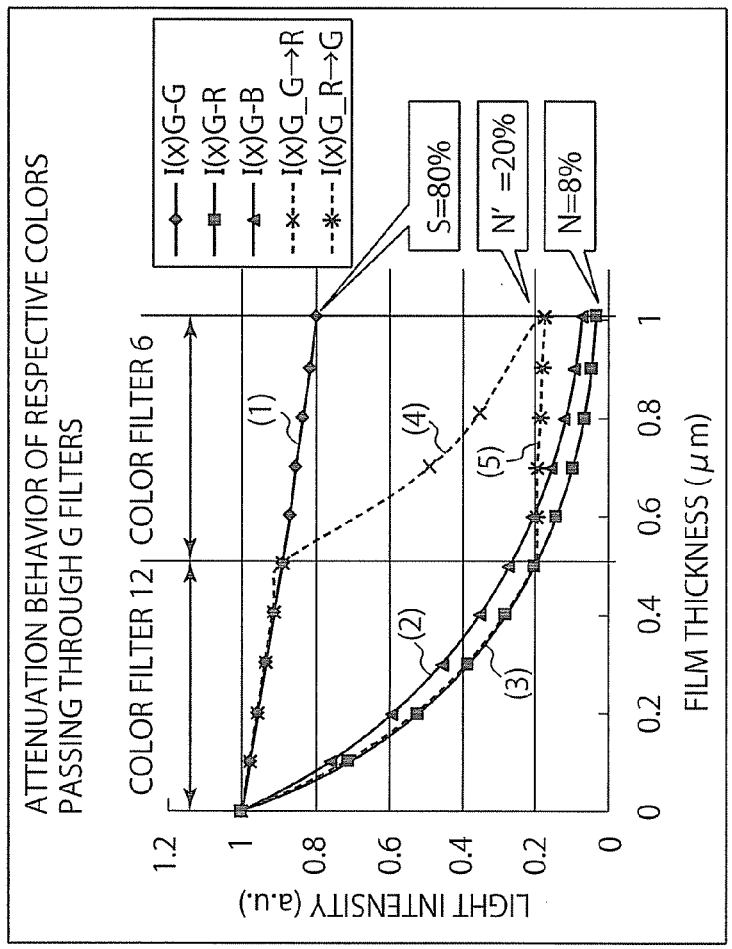
FIG. 11 is a diagram for explaining film thicknesses of the color filters and the color cross talk prevention effect.
Figure 11:
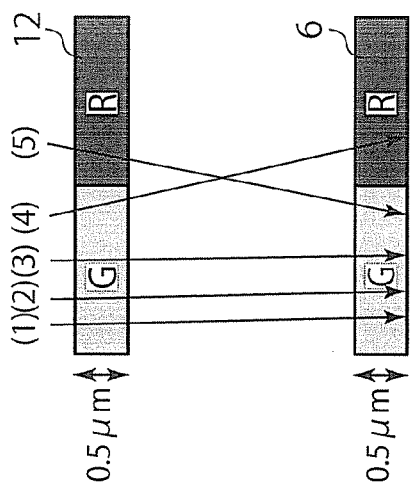
Figure 12:
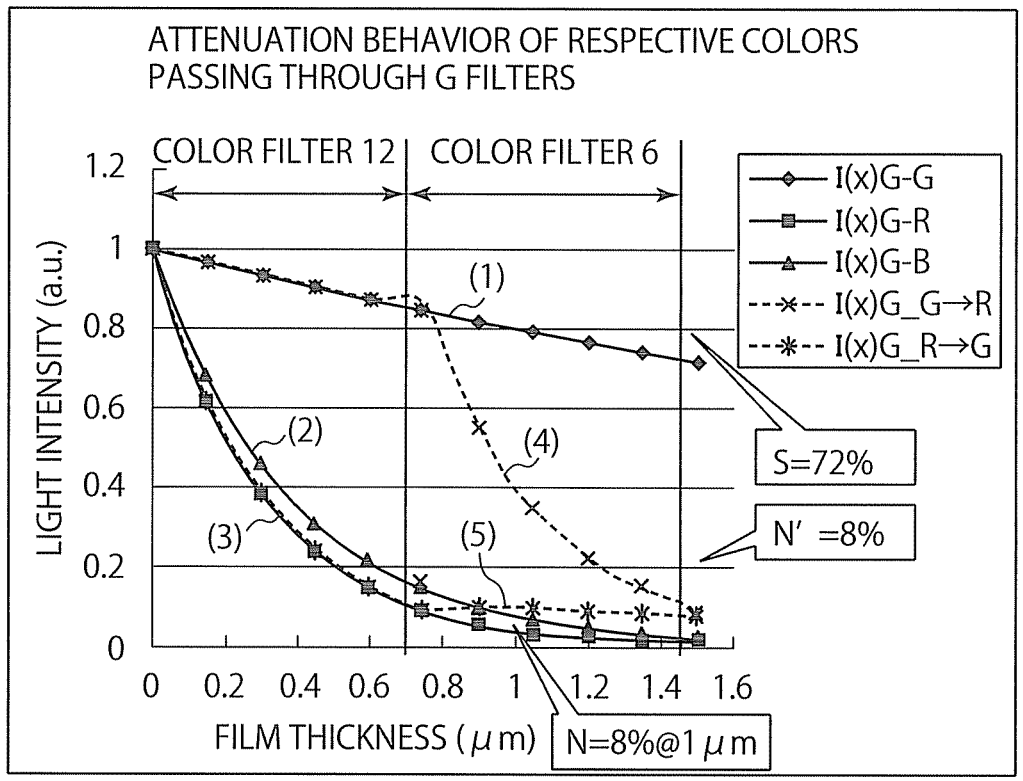
FIG. 12 is a diagram for explaining the film thicknesses of the color filters and the color cross talk prevention effect.

Referring now to FIGS. 11 and 12, the film thicknesses of the color filters 6 and 12, and the color cross talk prevention effect will be described. FIG. 11 is a graph showing the color cross talk prevention effect of the color filters 6 and 12. Example cases where the total film thickness of a color filter 6 and a color filter 12 is 1 μm, the thickness of each color filter 12 is 0.5 μm, and the thickness of each color filter 6 is 0.5 μm are described below. Referring to FIG. 11, the following cases (1) through (5) involving blue (B), green (G), and ref (R) are described: (1) a G ray passing through a G filter and a G filter; (2) a B ray passing through a G filter and a G filter; (3) a R ray passing through a G filter and a G filter; (4) a G ray passing through a G filter and a R filter; and (5) a G ray passing through a R filter and a G filter. Here, the cases (4) and (5) see color cross talk components between adjacent pixel blocks.

As the color filter characteristics, the intensity of a G ray that is a signal component and passes through G filters of 1 μm in total thickness hypothetically decreases to about 80% after the transmission. Also, R and B components that are color cross talk components and pass through G filters are absorbed by the G filters, and hypothetically decrease to about 8% after passing through G filters of 1 μm in total thickness. According to this hypothesis, the color cross talk components after transmission decrease to 20% in cases where there is a mixed color from adjacent pixels or in the cases (4) and (5).

FIG. 12 is a graph showing the color cross talk prevention effect achieved in a case where the film thicknesses of the color filters 6 and 12 are increased. As can be seen from the graph, in a case where the total film thickness of a color filter 6 and a color filter 12 is 1.5 μm, and the film thickness of each color filter 6 and the film thickness of each color filter 12 are both 0.75 μm, the total film thickness is made 1.5 times greater to restrain the crosstalk components to the level seen where rays pass through filters having a thickness of 1 μm. Here, the decrease in luminance is restrained to 8%.

(Manufacturing Method)

Referring now to FIGS. 13(a) through 14(c), a method for manufacturing the solid-state imaging device of the present embodiment will be described.

First, as shown in FIG. 13(a), the pixels 4 formed of photodiodes and a drive/read-out circuit (not shown) are formed on the semiconductor substrate 2, and color filter patterns 6 for the respective p×q pixel blocks are formed on the pixels 4. A transparent resin for smoothening or a light shielding film 7 is formed on each region where the color filters 6 are not necessary. A microlens 8 for pixel light gathering may be formed on the color filters 6 for each one pixel. Openings are formed in the upper surface of the semiconductor substrate 2, and electrode pads 22 are provided on the bottom faces of the openings.

The resin 9 for spacers is then applied to the portions around the imaging areas in which the pixels 4 are formed, and openings are formed by photolithography above the imaging areas in which the pixels 4 are formed (FIGS. 13(b) and 13(c)).

The visible light transmission substrate 14 having the microlens arrays 10 and the color filters 12 formed above the semiconductor substrate 2 is joined to the semiconductor substrate 2 with the use of alignment marks or the like (FIG. 13(d)). The visible light transmission substrate 14 may be made of a material that blocks unnecessary infrared rays, or may have a film that blocks infrared rays, for example. The joining is performed so that each combination of a color filter 6 and a color filter 12 represents one color.

Figure 13:
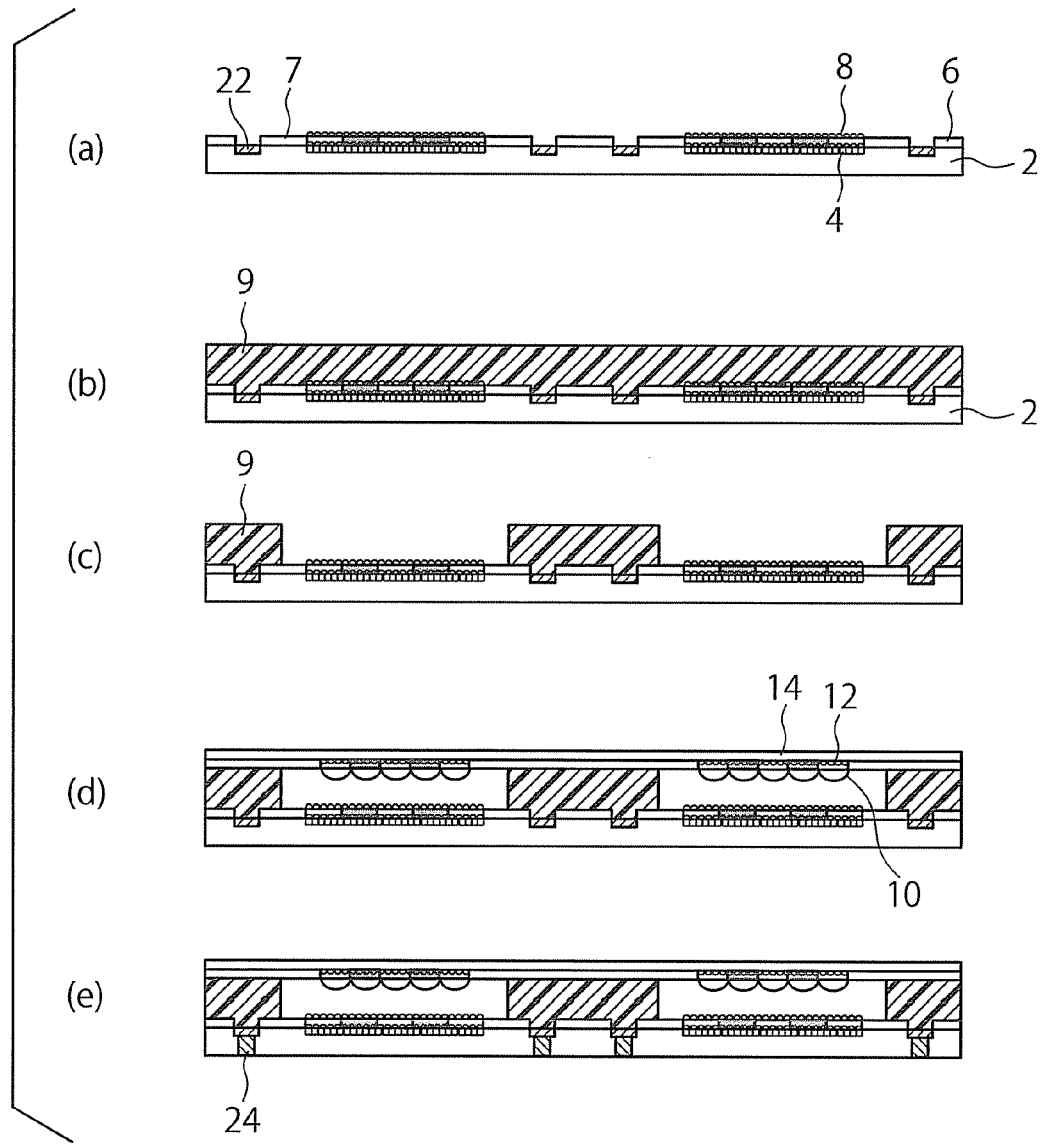
FIGS. 13(a) through 13(e) are diagrams for explaining a method for manufacturing the solid-state imaging device of the first embodiment.
Figure 14:
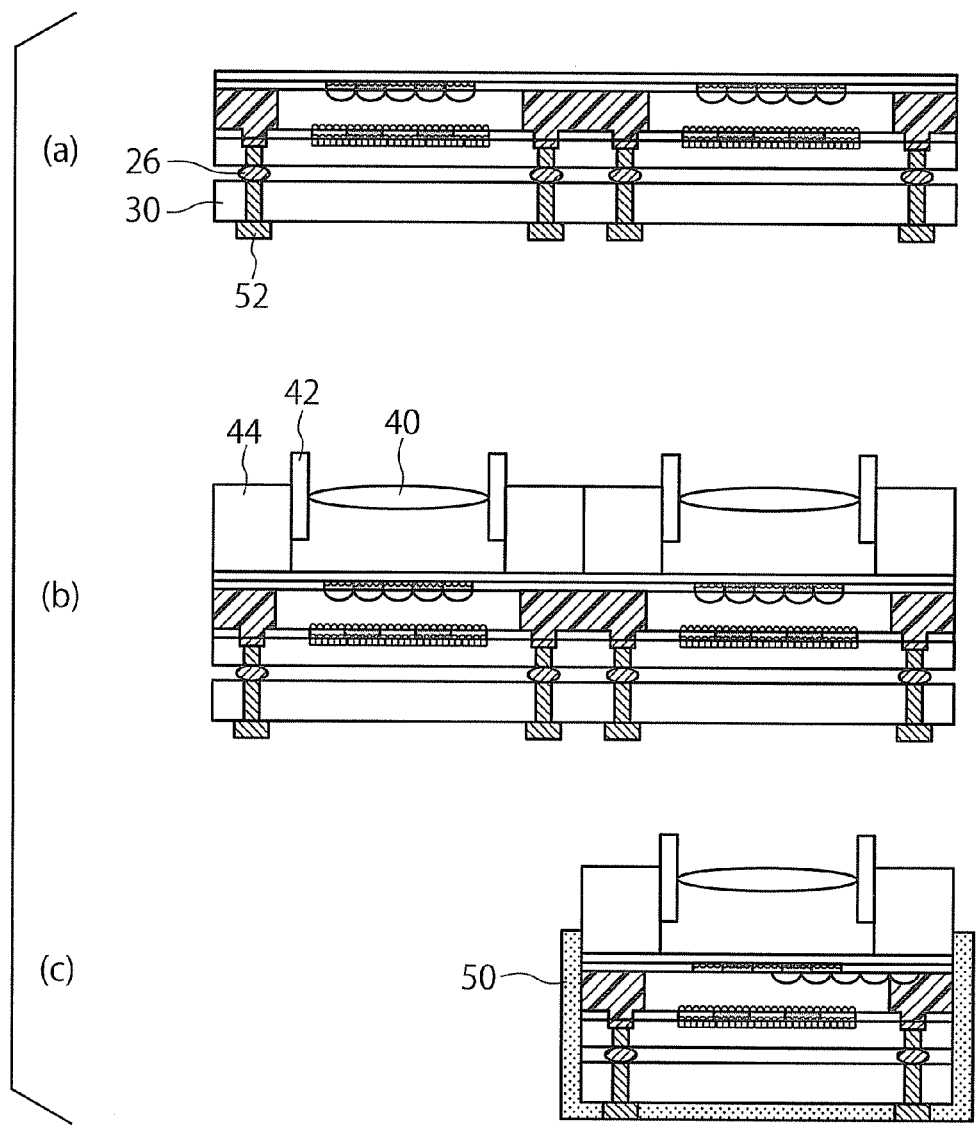
FIGS. 14(a) through 14(c) are diagrams for explaining the method for manufacturing the solid-state imaging device of the first embodiment.

The through electrodes 24 are then formed under the electrodes pads 22 for reading pixels (FIG. 13(*e*)). The semiconductor substrate 2 is then joined to the chip 30 having drive and processing circuits formed therein via the bumps 26 (FIG. 14(*a*)). The imaging lenses 40 mounted on the lens holders 44 and the lens tubes 42 are positioned above the pixels 4, and are bonded onto the semiconductor substrate 2 (FIG. 14(*b*)). At the time of the attachment, the focal length of the imaging lenses 40 may be adjusted based on the relationship between the pressure and output images. The resultant structure is then separated from one unit module from another, and the light shielding cover 50 for shielding unnecessary light is attached to the periphery of each module, to complete solid-state imaging devices (FIG. 14(*c*)).

Figure 15:
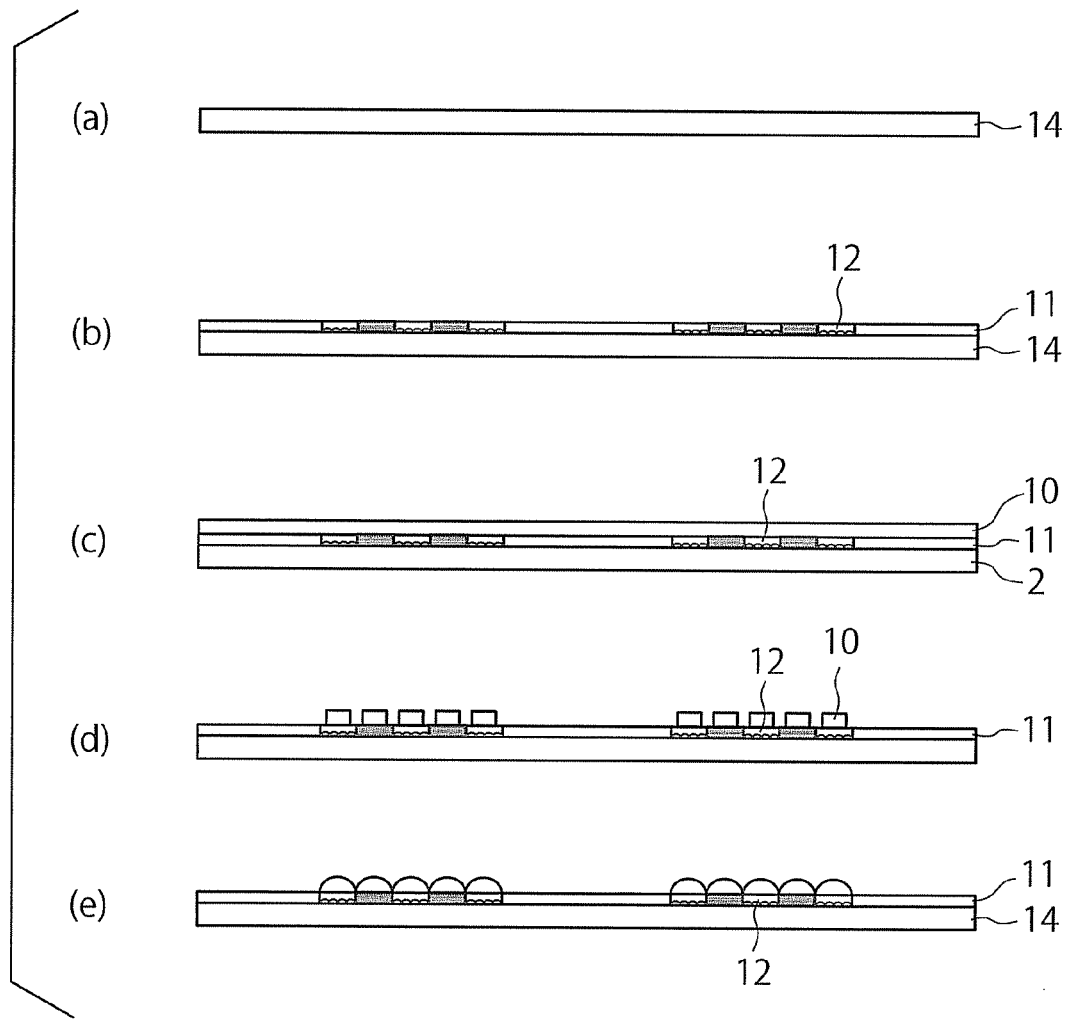
FIGS. 15(a) through 15(e) are diagrams for explaining a method for manufacturing the color filters and the microlenses.

Referring now to FIGS. 15(*a*) through 15(*e*), a method for manufacturing the color filters and the microlenses will be described.

A microlens array is produced by photolithography or an etching technique that is a widely-used semiconductor manufacturing technique. In the following, an example case where the color filters 12 and the microlenses 10 are formed on the visible light transmission substrate 14 is described. However, the color filters 6 and the microlenses 8 can be formed on the semiconductor substrate 2 in the same manner.

The visible light transmission substrate 14 is first prepared, and the color filters 12 are formed on the visible light transmission substrate 14 by photolithography (FIGS. 15(*a*) and 15(*b*)). Where the arrangement of the color filters 12 is a Bayer arrangement of blue, green, and red, pigments or coloring resins of the respective colors are applied, and patterning is performed by photolithography. The procedures are repeated to produce the color filters 12.

A photosensitive resin for re-imaging microlenses is then applied onto the color filters 12 (FIG. 15(*c*)). A resin pattern with the same cycles as the arrangement cycles of the pixel blocks and the color filters 6 is formed by using a photolithography technique (FIG. 15(*d*)).

The resin is then thermally deformed by subjecting the substrate to a heat treatment, to form a lens-shaped pattern. In this manner, the microlenses 10 are formed (FIG. 15(*e*)).

In the above description, the microlens array is produced with a photosensitive transparent resin. However, a resin microlens pattern may be formed on a glass substrate in the same manner as above, for example, and consequently anisotropic etching may be uniformly performed on the glass substrate and the photoresist by reactive ion etching or the like. In this manner, the shapes of the resin may be transferred onto the glass substrate. In this case, the microlenses are formed before the color filters are formed. Therefore, the color filters are formed on the microlenses or on the back face side of the substrate.

(Image Reconstruction)

Next, image processing to be performed to acquire regular pixel images and range information from images obtained with the solid-state imaging device according to the present embodiment will be described. Single-color (red, blue, or green) images obtained with the respective pixel blocks have parallaxes in accordance with the positions of the respective microlenses. Image matching is performed between the two green pixel blocks in each Bayer arrangement to obtain longitudinal and lateral parallax information. In each Bayer arrangement, the blue and red pixels are perpendicular to the green pixels located at two diagonal points. Accordingly, the parallaxes of the red and blue images can be calculated from the parallax components obtained from the two green images.

Since the parallaxes contain range information, the distance from the subject can be estimated from the parallaxes obtained through the image matching. Also, the blue and green images are reconstructed from the parallaxes, so that a two-dimensional image that can be obtained with a regular camera can be reconstructed.

As for the image matching, a known template matching technique may be employed to check the similarity and difference between two images. To determine the position of deviation with higher precision, the similarities and likenesses obtained with respect to the respective pixels are interpolated with continuous fitting functions or the like. The amount of deviation can be determined with even higher precision by determining sub pixel positions that provide the maximum and minimum values of the fitting functions.

As described above, in the present embodiment, filtering is performed on the respective colors on the side of the microlenses 10 and the side of the pixel blocks, and adjacent color cross talk components with different colors are absorbed and eliminated by the color filters 6 and 12. The color filters 6 and 12 deviate to the periphery of the imaging area in accordance with the angles of the principal rays for the microlenses 10 among the light rays that enter the microlens array 10 from the imaging plane 60, and the amount of deviation becomes larger toward the periphery of the imaging area. With this arrangement, color cross talk is effectively prevented, and the effective imaging area for the respective microlenses 10 is made larger.

According to the present embodiment, optical color cross talk between adjacent microlenses is prevented, and decreases in matching accuracy among the parallax images can be restrained.

Since the amount of deviation of the color filters 6 and 12 deviating to the periphery of the imaging area becomes larger toward the periphery of the imaging area, the vignetting of light rays having large incident angles at the peripheral portion can be minimized. The amount of deviation can be arbitrarily set depending on characteristics of the imaging angle of the imaging lens 40, and can be reflected in the mask designing for the color filters 6 and the color filters 12. This allows flexibility in the designing.

Also, there is no need to prepare additional components, such as shutter components for preventing a mixed color from entering adjacent lenses, and partition walls having concave and convex structures. Accordingly, the costs can be lowered. Further, decreases in yield at the time of assembling due to errors in component alignment or the like can be prevented.

Also, the color filters 12 and the microlenses 10 can be formed on the transparent wafer 14 through a regular semiconductor process normally used with a wafer. Accordingly, a solid-state imaging element can be assembled in wafer scale.

In a case where each one pixel is miniaturized to the optical limit of the imaging lens 40, long wavelengths such as the red color have the problem of optical color cross talk with adjacent pixels, since they exhibit a low absorption coefficient in silicon photodiodes. In the present embodiment, however, a color filter is provided for each pixel block, instead of each one pixel. With this arrangement, adjacent pixels in each pixel block photoelectrically convert the components of the same color to prevent crosstalk between the photodiodes.

Although a pigment dispersing resist is often used for color filters, the particle size of the pigment becomes about the same as the pixel size due to pixel miniaturization, and the color filters on the respective pixels have uneven spectroscopic characteristics due to uneven application of the pigment particles. In the present embodiment, however, a color filter is provided for each pixel block, and an averaging operation can be performed on color information at adjacent pixels. Accordingly, degradation of the spectroscopic characteristics due to unevenness can be more effectively prevented than in a case where one pixel filter is provided for each one pixel.

Also, since the imaging lens minimizes the chromatic aberration, the designing becomes complicated, involving more than one lens, a nonspherical lens, or the like. However, by providing a color filter and a microlens for each one pixel block, the imaging characteristics (the focal lengths) of the microlenses can be changed for each color. Accordingly, the chromatic aberration requirement on the lens side is relaxed, and the costs of lenses can be lowered.

Also, the solid-state imaging device can be made as small as an imaging element chip. Since an extension to the outside is realized with the use of the through electrodes, there is no need to use bonding wires. Therefore, after the photosensitive area is sealed with the transparent substrate 14 on which the microlens array 10 and the color filters 12 are formed, the dust adhering onto the surface of the transparent substrate 14 is a problem. In the present embodiment, however, the surface of the transparent substrate 14 and the photosensitive area are located in an optical path that has a distance determined by the thickness of the transparent substrate 14 and the thickness of the adhesive agent, and causes imaging on the lenses. Therefore, the adhering dust is out of focus on the photosensitive area, and has much smaller influence on black scratches than the dust adhering onto the photosensitive area in a conventional solid-state imaging device.

Second Embodiment

Figure 16:
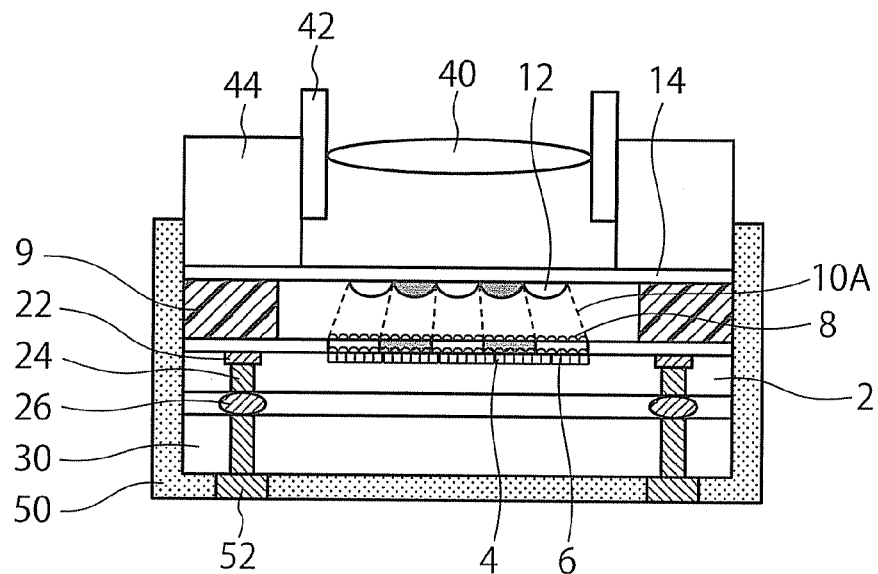
FIG. 16 is a cross-sectional view of a solid-state imaging device according to a second embodiment.

FIG. 16 shows a solid-state imaging device according to a second embodiment. The solid-state imaging device of the second embodiment is the same as the solid-state imaging device of the first embodiment shown in FIG. 1, except that the microlenses 10 and the color filters 12 are replaced with microlenses 10A having spectroscopic characteristics. The microlenses 10A also serve as color filters, and may be formed by a pigment dispersing resist.

The second embodiment can achieve the same effects as those of the first embodiment.

Third Embodiment

Figure 17:
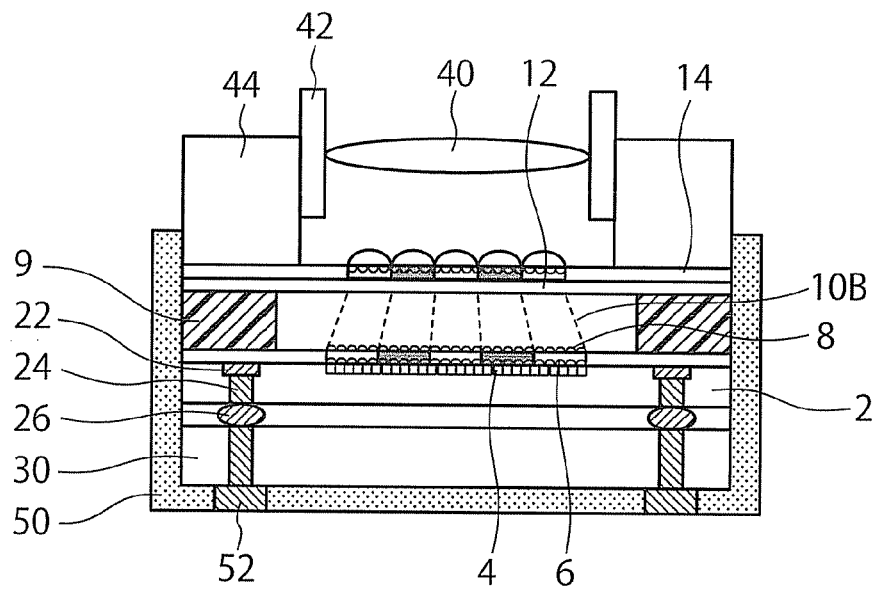
FIG. 17 is a cross-sectional view of a solid-state imaging device according to a third embodiment.

FIG. 17 shows a solid-state imaging device according to a third embodiment. The solid-state imaging device of the third embodiment is the same as the solid-state imaging device of the first embodiment shown in FIG. 1, except that the microlenses 10 are replaced with microlenses 10B. The microlenses 10B are formed on the color filters 12 on the side of the imaging optical lens (the imaging lens) 40, and the convex portions of the microlenses 10B face the imaging optical system (the imaging lens) 40.

The third embodiment can also achieve the same effects as those of the first embodiment.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A solid-state imaging device comprising:
an imaging element formed on a semiconductor substrate, and comprising an imaging area including a plurality of pixel blocks each including a plurality of pixels;
a first optical system configured to focus an image of a subject on an imaging plane;
a second optical system comprising a microlens array including a plurality of microlenses corresponding to the pixel blocks, and re-focusing the image of the imaging plane onto the pixel blocks corresponding to the respective microlenses;
a first filter placed on the second optical system, and including a plurality of first color filters corresponding to the microlenses; and
a second filter placed on the imaging element, and including a plurality of second color filters corresponding to the first color filters of the first filter, wherein, the first and second filters are designed so that the first and second color filters deviate to a periphery of the imaging area, the deviation becoming larger toward the periphery of the imaging area, wherein an amount of the deviation α of the color filters is represented by:

$$\alpha = D \times \tan\theta$$

where, θ represents the incident angle of a light ray entering a corresponding microlens from the imaging plane, and D represents a distance between the first and second filters.

2. The device according to claim 1, wherein the second color filters of the second filter are arranged to correspond to the respective first color filters of the first filter with the same color as the second color filters.

3. The device according to claim 1, wherein the second optical system is provided on the side of the imaging element with respect to the first filter.

4. The device according to claim 1, wherein the second optical system is provided on a side of the first optical system with respect to the first filter.

5. The device according to claim 1, wherein the second optical system includes the first filter.

6. The device according to claim 1, wherein the first and second color filters each include red, green, and blue color filters.

7. The device according to claim 6, wherein each of the first and second filters is in a Bayer arrangement, and a distance to the subject is determined by performing image matching between two green pixel blocks existing in each one unit of the Bayer arrangement.

8. A solid-state imaging device comprising:
an imaging element formed on a semiconductor substrate, and comprising an imaging area including a plurality of pixel blocks each including a plurality of pixels;
a first optical system configured to focus an image of a subject on an imaging plane;
a second optical system comprising a microlens array including a plurality of microlenses corresponding to the pixel blocks, and re-focusing the image of the imaging plane onto the pixel blocks corresponding to the respective microlenses;
a first filter placed on the second optical system, and including a plurality of first color filters corresponding to the microlenses; and
a second filter placed on the imaging element, and including a plurality of second color filters corresponding to the first color filters of the first filter, wherein, the first and second filters are designed so that the first and second color filters deviate to a periphery of the imaging area, the deviation becoming larger toward the periphery of the imaging area, wherein another microlens array including other microlenses corresponding to the respective pixels is provided on the opposite side of the second filter from the imaging element.

9. A solid-state imaging device comprising:

an imaging element formed on a semiconductor substrate, and comprising an imaging area including a plurality of pixel blocks each including a plurality of pixels;

a first optical system configured to focus an image of a subject on an imaging plane;

a second optical system comprising a microlens array including a plurality of microlenses corresponding to the pixel blocks, and re-focusing the image of the imaging plane onto the pixel blocks corresponding to the respective microlenses;

a first filter placed on the second optical system, and including a plurality of first color filters corresponding to the microlenses; and a second filter placed on the imaging element, and including a plurality of second color filters corresponding to the first color filters of the first filter, wherein, the first and second filters are designed so that the first and second color filters deviate to a periphery of the imaging area, the deviation becoming larger toward the periphery of the imaging area, and wherein the first and second color filters each include red, green, and blue color filters, and wherein each of the first and second filters is in a Bayer arrangement, and a distance to the subject is determined by performing image matching between two green pixel blocks existing in each one unit of the Bayer arrangement.

10. A solid-state imaging device comprising:

an imaging element formed on a semiconductor substrate, and comprising an imaging area including a plurality of pixel blocks each including a plurality of pixels;

a first optical system configured to focus an image of a subject on an imaging plane;

a second optical system comprising a microlens array including a plurality of microlenses corresponding to the pixel blocks, and re-focusing the image of the imaging plane onto the pixel blocks corresponding to the respective microlenses;

a first filter placed on the second optical system, and including a plurality of first color filters corresponding to the microlenses;

a second filter placed on the imaging element, and including a plurality of second color filters corresponding to the first color filters of the first filter; and a processing unit configured to perform image matching between two pixel blocks having the same color to determine a distance to the subject, wherein, the first and second filters are designed so that the first and second color filters deviate to a periphery of the imaging area, the deviation becoming larger toward the periphery of the imaging area.

11. The device according to claim 10, wherein the second color filters of the second filter are arranged to correspond to the respective first color filters of the first filter with the same color as the second color filters.

12. The device according to claim 10, wherein an amount of the deviation $\alpha$ of the color filters is represented by:

$$\alpha = D \times \tan\theta$$

where, $\theta$ represents the incident angle of a light ray entering a corresponding microlens from the imaging plane, and D represents a distance between the first and second filters.

13. The device according to claim 10, wherein the second optical system is provided on the side of the imaging element with respect to the first filter.

14. The device according to claim 10, wherein the second optical system is provided on a side of the first optical system with respect to the first filter.

15. The device according to claim 10, wherein the second optical system includes the first filter.

16. The device according to claim 10, wherein another microlens array including other microlenses corresponding to the respective pixels is provided on the opposite side of the second filter from the imaging element.

17. The device according to claim 10, wherein the first and second color filters each include red, green, and blue color filters.

18. The device according to claim 17, wherein each of the first and second filters is in a Bayer arrangement, and the processing unit performs the image matching between two green pixel blocks existing in each one unit of the Bayer arrangement to determine the distance to the subject.

* * * * *